United States Patent
Bejerano et al.

(10) Patent No.: US 8,509,232 B2
(45) Date of Patent: Aug. 13, 2013

(54) METHOD AND APPARATUS FOR FAULT-RESILIENT MULTICAST AND UNICAST IN TRANSPORT NETWORKS

(75) Inventors: Yigal Bejerano, Springfield, NJ (US); Pramod V. Koppol, Manalapan, NJ (US)

(73) Assignee: Alcatel Lucent, Paris (FR)

( * ) Notice: Subject to any disclaimer, the term of this patent is extended or adjusted under 35 U.S.C. 154(b) by 305 days.

(21) Appl. No.: 12/426,453

(22) Filed: Apr. 20, 2009

(65) Prior Publication Data

US 2010/0265945 A1   Oct. 21, 2010

(51) Int. Cl.
    *H04L 12/28* (2006.01)
(52) U.S. Cl.
    USPC .......................... 370/390; 370/428; 370/432
(58) Field of Classification Search
    USPC .............. 370/390, 392, 400, 408, 428, 432
    See application file for complete search history.

(56) References Cited

U.S. PATENT DOCUMENTS

| | | | |
|---|---|---|---|
| 6,047,331 A | 4/2000 | Medard et al. | |
| 6,791,980 B1 * | 9/2004 | Li | 370/390 |
| 7,203,743 B2 * | 4/2007 | Shah-Heydari | 709/223 |
| 7,274,869 B1 * | 9/2007 | Pan | 398/5 |
| 7,447,225 B2 * | 11/2008 | Windisch et al. | 370/428 |
| 7,516,116 B2 * | 4/2009 | Shen et al. | 707/999.002 |
| 7,646,739 B2 * | 1/2010 | Previdi et al. | 370/312 |
| 7,719,957 B2 * | 5/2010 | Raahemi et al. | 370/217 |
| 7,792,982 B2 * | 9/2010 | Padmanabhan et al. | 709/231 |
| 8,064,446 B2 * | 11/2011 | Ramakrishnan et al. | 370/390 |
| 8,274,989 B1 * | 9/2012 | Allan et al. | 370/432 |
| 8,345,536 B1 * | 1/2013 | Rao et al. | 370/216 |
| 2006/0187950 A1 * | 8/2006 | Bou-Diab et al. | 370/432 |
| 2007/0047556 A1 * | 3/2007 | Raahemi et al. | 370/395.53 |
| 2007/0086363 A1 | 4/2007 | Wakumoto | |

FOREIGN PATENT DOCUMENTS

EP   1 978 688 A1   10/2008

OTHER PUBLICATIONS

Bejerano and Kappol, "Optimal Construction of Redundant Multicast Trees in Directed Graphs," Infocom 2009, Apr. 19-25, 2009, Rio de Janiero, Brazil.

Cha et al., "Path Protection Routing with SRLG Constraints to Support IPTV in WDM Mesh Networks," Infocom 2009, Apr. 19-25, 2009, Rio de Janiero, Brazil.

(Continued)

*Primary Examiner* — Dang Ton
*Assistant Examiner* — Brian O Connor
(74) *Attorney, Agent, or Firm* — Wall & Tong, LLP

(57) ABSTRACT

A capability is provided for supporting fault-resilient propagation of traffic in networks using redundant multicast trees (RMTs). Fault-resilient propagation of traffic from a first node to a second node is supported using one or both of a pair of RMTs rooted at the first node and a pair of RMTs rooted at the second node. The pair of RMTs rooted at the first node includes a pair of node-disjoint paths from the first node to the second node. The pair of RMTs rooted at the second node includes a pair of node-disjoint paths from the second node to the first node. The first node propagates multicast traffic toward the second node using at least one of the RMTs in the pair of RMTs rooted at the first node. The first node propagates unicast traffic toward the second node using at least one of: at least one of the RMTs in the pair of RMTs rooted at the first node, or at least one of the RMTs in the pair of RMTs rooted at the second node.

20 Claims, 5 Drawing Sheets

(56) References Cited

OTHER PUBLICATIONS

International Search Report and The Written Opinion of the International Searching Authority, or the Declaration, in corresponding PCT/US2010/030731, Alcatel-Lucent USA Inc., Applicant, mailed May 31, 2010, 12 pages.
"Redundant Trees for Preplanned Recovery in Arbitrary Vertex-Redundant or Edge-Redundant Graphs," by Medard, Finn, Barry, and Gallager, IEEE/ACM Transactions on Networking, vol. 7, No. 5, Oct. 1999.
"Linear Time Construction of Redundant Trees for Recovery Schemes Enhancing QOP and QOS," by Zhang, Xue, Tang, and Thulasiraman, INFOCOM 2005, 24th Annual Joint Conference of the IEEE Computer and Communications Societies, Proceedings IEEE, vol. 4, p. 2702-2710, Mar. 2005.
"The Multi-tree Approach to Reliability in Distributed Networks," by Rai and Rodeh, IEEE Symposium on Foundations of Computer Science, 1984, p. 137-147.

* cited by examiner

METHOD AND APPARATUS FOR FAULT-RESILIENT MULTICAST AND UNICAST IN TRANSPORT NETWORKS

FIELD OF THE INVENTION

The invention relates to the field of transport networks and, more specifically but not exclusively, to providing fault-resilient propagation of traffic in transport networks.

BACKGROUND

As demand for multicast services continues to grow, service providers continue to seek low-cost, bandwidth-efficient, and fault-resilient multicast transport capabilities for supporting the multicast services. In existing multicast transport networks, several different mechanisms are employed in an attempt to provide carrier-grade transport, at least some of which are based on the Ethernet technology known as Provider Backbone Bridging-Traffic Engineered (PBB-TE). These mechanisms attempt to upgrade commonly-used Ethernet technology to meet rigorous requirements of carrier-grade transport networks. More specifically, these mechanisms utilize independent spanning trees for each Virtual LAN (VLAN), where each VLAN spanning tree uniquely determines paths of the packets belonging to the VLANs. Disadvantageously, however, use of such mechanisms is inefficient and, thus, costly.

SUMMARY

Various deficiencies in the prior art are addressed by embodiments that support fault-resilient propagation of multicast traffic and unicast traffic using redundant multicast trees (RMTs).

In one embodiment, fault-resilient propagation of traffic from a first node to a second node is supported using one or both of a pair of RMTs rooted at the first node and a pair of RMTs rooted at the second node. The pair of RMTs rooted at the first node includes a pair of node-disjoint paths from the first node to the second node. The pair of RMTs rooted at the second node includes a pair of node-disjoint paths from the second node to the first node. The first node propagates multicast traffic toward the second node using at least one of the RMTs in the pair of RMTs rooted at the first node. The first node propagates unicast traffic toward the second node using at least one of: at least one of the RMTs in the pair of RMTs rooted at the first node, or at least one of the RMTs in the pair of RMTs rooted at the second node.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

A fault-resilient traffic propagation capability, adapted for use in providing fault-resilient transport of multicast traffic and unicast traffic in transport networks, is depicted and described herein. The fault-resilient traffic propagation capability is primarily depicted and described within the context of providing fault-resilient propagation of multicast traffic and unicast traffic within Ethernet-based transport networks, however, it will be appreciated by one skilled in the art and informed by the teachings herein that the fault-resilient traffic propagation capability depicted and described herein may be used to provide fault-resilient transport of multicast and unicast traffic in other types of networks.

Figure 1:
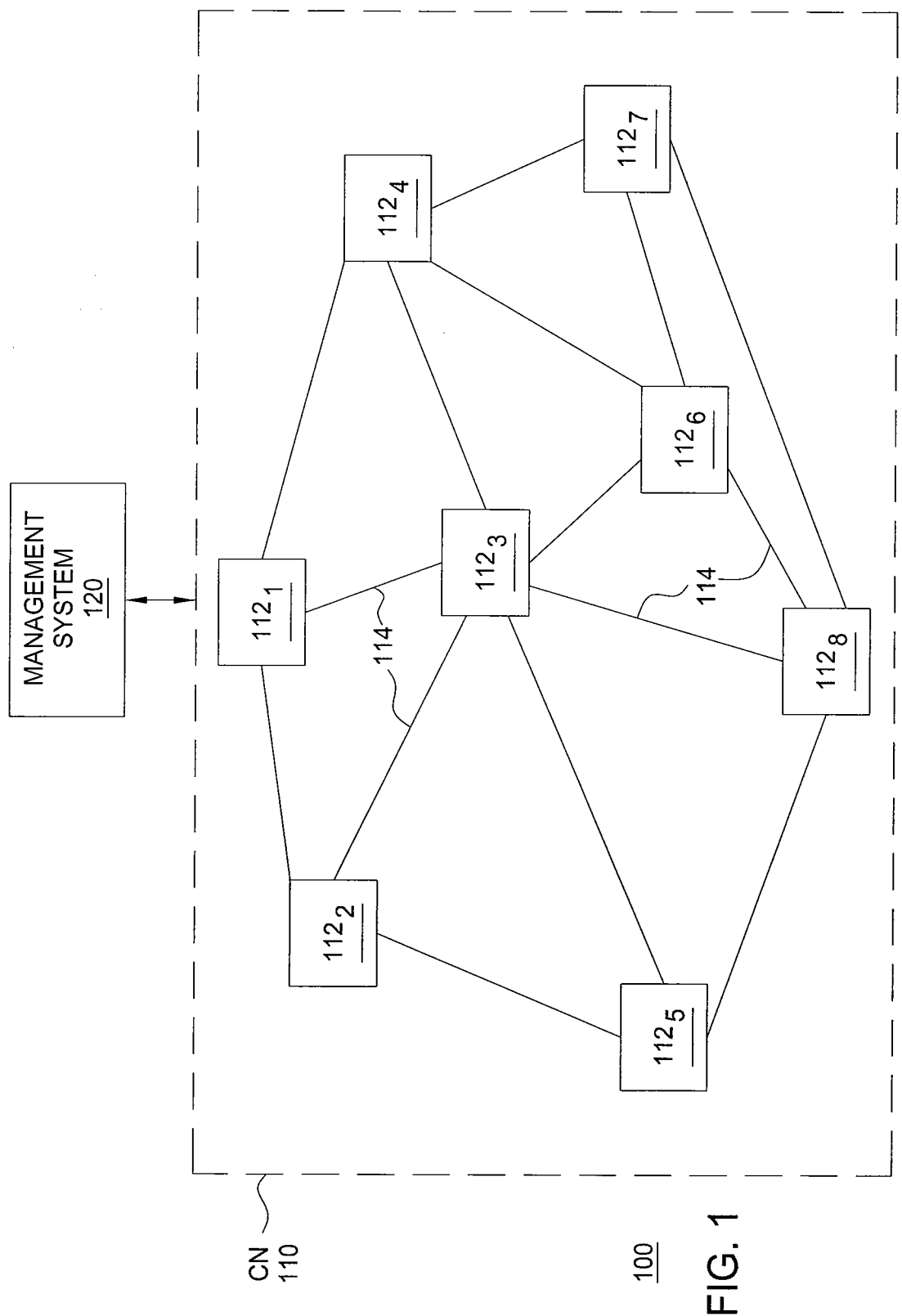
FIG. 1 depicts a high-level block diagram of a communication system.

FIG. 1 depicts a high-level block diagram of a communication system. As depicted in FIG. 1, communication system 100 includes a communication network (CN) 110 and a management system (MS) 120. The CN 110 is a mesh network including a plurality of communication nodes (CNs) $112_1$-$112_8$ (collectively, CNs 112). The CNs 112 communicate using a plurality of communication paths (CPs) 114.

The CNs 112 of CN 110 are transport nodes. In one embodiment, in which CN 110 is an Ethernet-based transport network, CNs 112 are Ethernet transport nodes. In this embodiment, the CNs 112 each support Ethernet capabilities, such as forwarding and bridging capabilities, as well as any other capabilities which may be supported by Ethernet-based transport nodes. The CNs 112 may be nodes associated with other transport technologies.

The CPs 114 of CN 110 are communication paths, which may include direct connections between the CNs 112 and/or indirect connections between the CNs 112 (e.g., connections which may traverse other nodes). The CPs 114 may be any type of communication paths adapted for supporting traffic for CNs 112. The CPs 114 may support propagation of traffic using any underlying technologies suitable for supporting propagation of traffic.

Although depicted and described herein with respect to specific types, numbers, and topologies of communication nodes and communication paths (illustratively, the CNs 112 and CPs 114 of CN 110), it will be appreciated, by those skilled in the art and informed by the teachings herein, that the fault-resilient traffic propagation capabilities depicted and described herein may be utilized in transport networks having other types, numbers, and topologies of communication nodes and communication paths.

The MS 120 is a management system providing management functions for CN 110. The management functions which may be provided by MS 120 are described in detail hereinbelow. The MS 120 communicates with CN 110 via a communication path (CP) 121. The MS 120 communicates with each of the CNs 112 of CN 110 via CP 121 and CPs 114 of CN 110. The MS 120 may communicate with the CNs 112 in any other suitable manner.

As described herein, redundant multicast trees (RMTs) are utilized to support fault-resilient transport of multicast traffic and unicast traffic within a transport network (e.g., such as in the exemplary communication network, CN 110, of FIG. 1).

Two trees rooted at a source node r are termed RMTs if those two trees provide two node-disjoint paths from source node r to every destination node in a set of destination nodes. Two trees termed RMTs may be referred to as a pair of RMTs. A pair of RMTs computed for a target node may be said to include a first RMT and a second RMT, where the first RMT and second RMT provide a pair of node-disjoint paths from the target node to each of the other nodes associated with the pair of RMTs.

A node for which a pair of RMTs is computed is the root of the RMTs, and, thus, the pair of RMTs computed for the node are said to be rooted at that node. For a node having a pair of RMTs rooted thereat, under any single failure scenario (e.g., a failure of any single node, or a failure of any single link between nodes), the root node is able to communicate with every destination node using at least one of the two RMTs in the pair of RMTs rooted at that node. The RMTs also may be referred to as Protected Point-to-Multipoint (P2MP) trees.

A pair of RMTs rooted at a node may be computed using any suitable method for computing a pair of RMTs. In one embodiment, for example, the pair of RMTs computed for a node may be computed as described in "Redundant Trees for Preplanned Recovery in Arbitrary Vertex-Redundant or Edge-Redundant Graphs," by Medard, Finn, Barry, and Gallager, IEEE/ACM Transactions on Networking, Vol. 7, No. 5, October 1999, which is incorporated by reference herein in its entirety. In one embodiment, for example, the pair of RMTs computed for a node may be computed as described in "Linear Time Construction of Redundant Trees for Recovery Schemes Enhancing QOP and QOS," by Zhang, Xue, Tang, and Thulasiraman, INFOCOM 2005, 24th Annual Joint Conference of the IEEE Computer and Communications Societies, Proceedings IEEE, Vol. 4, March 2005, which is incorporated by reference herein in its entirety. In one embodiment, for example, the pair of RMTs computed for a node may be computed as described in "The Multi-tree Approach to Reliability in Distributed Networks," by Itai and Rodeh, IEEE Symposium on Foundations of Computer Science, 1984, which is incorporated by reference herein in its entirety. In one embodiment, multiple such methods of computing a pair of RMTs for a node may be used together. The pair of RMTs for a node may be computed using any other suitable method(s) for computing RMTs.

A pair of RMTs is computed for each of one or more nodes. The one or more nodes may be a set of nodes, which may include any suitable scope of nodes. For example, a set of nodes may include a subset of the nodes of a transport network, all of the nodes of a transport network, some or all of the nodes of each of multiple transport networks, and the like, as well as various combinations thereof. In other words, a pair of RMTs computed for a source node r provides a pair of node-disjoint paths from the source node r to every destination node in a set of destination nodes, where the set of destination nodes may include any suitable combination of nodes to which traffic may be propagated from the source node r using the pair of RMTs.

In one embodiment, in which pairs of RMTs are computed for respective nodes of a set of nodes, the pairs of RMTs computed for nodes of a set of nodes are made uniquely identifiable for the set of nodes.

The pairs of RMTs may be made uniquely identifiable within the set of nodes in any suitable manner.

In one embodiment, for example, the two RMTs computed for a node are each assigned a respective identifier.

In one such embodiment, the identifiers assigned to the RMTs of a node include information which identifies that node. This will ensure that each RMT identifier within the set of nodes is unique.

In another such embodiment, identifiers assigned to the RMTs of a node may be mapped to an identifier of that node. In this embodiment, the RMT identifiers of a node must be unique for that node (and, optionally, each RMT identifier of the set of nodes may be unique, although this is not required since the mapping of each node to its associated RMT identifiers will provide unique identification of RMTs within the set of nodes). In this embodiment, a combination of node identifier and RMT identifier provide unique identification of RMTs within the set of nodes.

The nodes of the set of nodes are each configured to include RMT information for each of the RMTs of the set of nodes. The RMT information provides an indication of each RMT pair rooted at each respective node of the set of nodes. In other words, for a given node of a set of nodes, that given node is configured to be able to: (1) identify the RMT identifiers of the two RMTs rooted at that given node (i.e., RMTs rooted at itself) and (2) identify, for each other node of the set of nodes, the RMT identifiers of the two RMTs rooted at that other node of the set of nodes. This ensures that a given node of the set of nodes is able to: (1) propagate multicast traffic, to each of the other nodes in the set of nodes, using the pair of RMTs rooted at that given node (i.e., using the RMTs rooted at itself) and (2) propagate unicast traffic, to each other node in the set of nodes, using the pair of RMTs rooted at that given node or the pair of RMTs rooted at the other node to which the unicast traffic is to be propagated. The propagation of multicast traffic and unicast traffic using RMTs is described in additional detail hereinbelow.

The RMT information may be specified using any suitable information and/or in any suitable format. In one embodiment, for example, in which identifiers assigned to the RMTs of node identify that node, a list of RMT identifiers for each of the RMTs computed for the set of nodes may be provided to each of the nodes of the set of nodes. In one embodiment, for example, in which identifiers assigned to pairs of RMTs of respective nodes do not identify those nodes, a mapping table (including a mapping of RMT identifiers to the nodes at which those RMTs are rooted, respectively) may be provided to each of the nodes of the set of nodes. The RMT information may be specified using any other suitable information and/or in any other suitable format.

The nodes of the set of nodes may be configured to include the RMT information for each of the nodes of the set of nodes in any suitable manner. In one embodiment, for example, the RMT information is distributed to the nodes of the set of nodes by one or more management systems (e.g., by MS 120). In one embodiment, for example, the RMT information is exchanged between nodes of the set of nodes. The nodes of the set of nodes may be configured, to include the RMT information for each of the nodes of the set of nodes, in any other suitable manner.

The computation of the RMT pairs for nodes of the set of nodes, and the configuring of nodes of the set of nodes with RMT information of the computed RMTs pairs, may be performed by one or more network elements of the communication network. In one embodiment, for example, such functions are performed by one or more management systems (e.g., by MS 120). In one embodiment, for example, such functions are performed by one or more of the transport nodes (e.g., where one or more of CNs 112 is configured to perform such functions for CN 110). The aforementioned functions may be performed in any other suitable manner for computing RMT pairs for respective nodes and for configuring the respective nodes with RMT information for the RMT pairs computed for the respective nodes.

As described herein, following computation of RMT pairs for respective nodes, and configuration of nodes with RMT information for the RMT pairs computed for the respective nodes, the nodes use the computed RMTs for providing fault-resilient propagation of multicast traffic and unicast traffic between nodes of the set of nodes.

For multicast traffic to be propagated from a source node to multiple destination nodes, the multicast traffic is propagated using one or both of the RMTs in the pair of RMTs rooted at the source node. The multicast traffic is routed using the RMT identifier(s) of the RMT(s) on which the multicast traffic is propagated.

For unicast traffic to be propagated from a source node to a destination node, the unicast traffic is propagated using one of: (1) one or both of the RMTs in the pair of RMTs rooted at the source node, or (2) one or both of the RMTs in the pair of RMTs rooted at the destination node. If the unicast traffic is propagated using one or both of the RMTs in the pair of RMTs rooted at the source node, the unicast traffic is routed using the RMT identifier(s) of the RMT(s) on which the unicast traffic is propagated, and an identifier of the destination node for which the unicast traffic is intended. If the unicast traffic is propagated using one or both of the RMTs in the pair of RMTs rooted at the destination node, the unicast traffic is routed using the RMT identifier(s) of the RMT(s).

In the preceding description of fault-resilient propagation of multicast traffic and unicast traffic using RMT(s), reference is made to using one or both of the RMTs in a pair of RMTs to propagate traffic. This is to account for the different traffic protection schemes which may be used with the fault-resilient traffic propagation capabilities depicted and described herein.

A first traffic protection scheme which may be used to protect multicast traffic and/or unicast traffic is 1+1 protection. In a 1+1 traffic protection scheme, traffic is propagated over both the active RMT and the backup RMT of an RMT pair, such that the traffic may be selected at the receiver from either the active RMT or the backup RMT.

A second traffic protection scheme which may be used to protect multicast traffic and/or unicast traffic is 1:1 protection. In a 1:1 traffic protection scheme, one RMT in the RMT pair is designated as an active RMT and the other RMT in the RMT pair is designated as a backup RMT. In this traffic protection scheme, traffic is propagated over the active RMT in the absence of a failure condition, and traffic is propagated over both the active RMT and the backup RMT in the presence of a failure condition.

The signaling of failure condition information in the transport network may be performed using any suitable method of signaling failure condition information.

It will be appreciated that each node may use 1+1 protection and/or 1:1 protection for multicast traffic and/or unicast traffic. For example, one of the two schemes may be used by all of the nodes of the network, one of the two schemes may be used by some nodes of the network while the other of the two schemes may be used by other nodes of the network, one or more nodes of the network may use both protection schemes (e.g., using one scheme for unicast traffic and the other scheme for multicast traffic, switching between the schemes on a session-by-session or packet-by-packet basis independent of the type of traffic being transmitted, or using any other suitable combination of the schemes), and the like, as well as various combinations thereof. In other words, any node may use either or both of the two traffic protection schemes.

Although primarily depicted and described herein with respect to two traffic protection schemes, it will be appreciated that one or more other traffic protection schemes may be used, either in place of 1+1 protection and/or 1:1 protection, or in addition to 1+1 protection and/or 1:1 protection. Thus, it will be appreciated that any suitable traffic protection schemes may be employed in combination with the RMTs pairs depicted and described herein in order to provide fault-resilient propagation of multicast and unicast traffic in transport networks.

Figure 2:
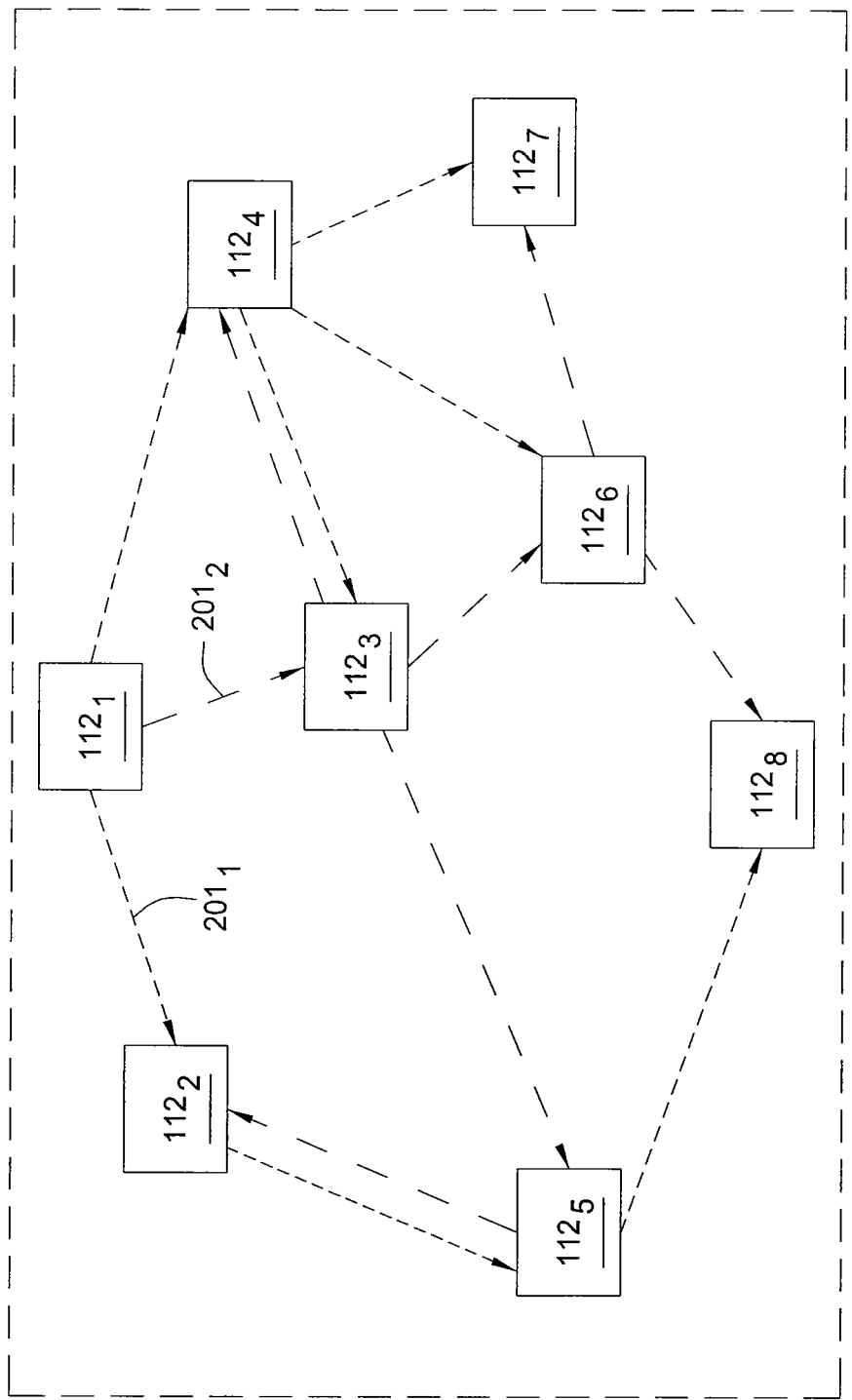
FIG. 2 depicts the communication network of FIG. 1, illustrating a pair of RMTs for a first communication node of the communication network of FIG. 1.

The use of RMTs for propagating multicast traffic in transport networks may be better understood by way of reference to the exemplary pair of RMTs depicted and described herein with respect to FIG. 2. The use of RMTs for propagating unicast traffic in transport networks may be better understood by way of reference to the exemplary pairs of RMTs depicted and described herein with respect FIG. 2 and FIG. 3.

FIG. 2 depicts the communication network of FIG. 1, illustrating a pair of RMTs for a first communication node of the communication network of FIG. 1. As depicted in FIG. 2, a pair of RMTs 201 is computed for CN $112_1$. The pair of RMTs 201 rooted at CN $112_1$ includes a first RMT $201_1$ and a second RMT $201_2$.

The first RMT $201_1$ includes the following paths: from CN $112_1$ to CN $112_2$, from CN $112_2$ to CN $112_5$, from CN $112_5$ to CN $112_8$, from CN $112_1$ to CN $112_4$, from CN $112_4$ to CN $112_3$, from CN $112_4$ to CN $112_6$, and from CN $112_4$ to CN $112_7$. Thus, every CN $112_2$-$112_8$ is reachable from root CN $112_1$ via first RMT $201_1$.

The second RMT $201_2$ includes the following paths: from CN $112_1$ to CN $112_3$, from CN $112_3$ to CN $112_5$, from CN $112_5$ to CN $112_2$, from CN $112_3$ to CN $112_4$, from CN $112_3$ to CN $112_6$, from CN $112_6$ to CN $112_7$, and from CN $112_6$ to CN $112_8$. Thus, every CN $112_2$-$112_8$ is reachable from root CN $112_1$ via second RMT $201_2$.

The first RMT $201_1$ and second RMT $201_2$ provide two node-disjoint paths from root node CN $112_1$ to every other node, CN $112_2$-CN $112_8$, in CN 110. For example, the path from CN $112_1$ to CN $112_8$ on first RMT $201_1$ follows the path CN $112_1 \rightarrow$ CN $112_2 \rightarrow$ CN $112_5 \rightarrow$ CN $112_8$, and the path from CN $112_1$ to CN $112_8$ on second RMT $201_2$ follows the path CN $112_1 \rightarrow$ CN $112_3 \rightarrow$ CN $112_6 \rightarrow$ CN $112_8$. The paths from CN $112_1$ to CN $112_8$ on first RMT $201_1$ and second RMT $201_2$ do not share any links or nodes between CN $112_1$ and CN $112_8$, and, thus, are disjoint. This holds true for paths from root CN $112_1$ to every other communication node in CN 110 (i.e., for CNs $112_2$-$112_7$).

As described herein, where root CN $112_1$ is operating as a source of multicast traffic to be delivered to each of the other CNs 112, one or both of the first RMT $201_1$ and the second RMT $201_2$ computed for and rooted at CN $112_1$ may be used to propagate multicast traffic from root node CN $112_1$ to each of the other CNs 112.

If 1+1 protection is used for the multicast traffic, the CN $112_1$ transmits the multicast traffic on both the first RMT $201_1$ and the second RMT $201_2$, and each of the receivers of the multicast traffic can receive the multicast traffic on the active RMT or the backup RMT (i.e., either first RMT $201_1$ or second RMT $201_2$, depending on whether there is a failure condition in the network).

If 1:1 protection is used for the multicast traffic, CN $112_1$ initially only transmits the multicast traffic on an active RMT (i.e., either first RMT $201_1$ or second RMT $201_2$, depending on which one is active). If there is a failure condition in the network, the root CN $112_1$ begins transmitting the multicast traffic on both the active RMT and the backup RMT (i.e., on both first RMT $201_1$ and second RMT $201_2$) until the failure condition is resolved.

Although omitted from FIG. 2 for purposes of clarity, one or more pairs of RMTs also may be computed for one or more other CNs 112 of the communication network, respectively.

As described hereinabove, the pair of RMTs 201 computed for CN $112_1$ also may be used for propagating unicast traffic from CN $112_1$ to individual ones of the other CNs 112. The unicast traffic may be propagated using the pair of RMTs 201 computed for CN $112_1$ using 1+1 and/or 1:1 protection. As described hereinabove, however, the pair of RMTs 201 computed for CN $112_1$ is not the only pair of RMTs available for use by the CN 112, for propagating unicast traffic from CN $112_1$; rather, for unicast traffic to be propagated from CN $112_1$ to one of the other CNs 112, the pair of RMTs that is rooted at the other one of the CNs 112 for which the unicast traffic is intended also may be used to propagate the unicast traffic). This capability is depicted and described in more detail with respect to FIG. 3.

Figure 3:
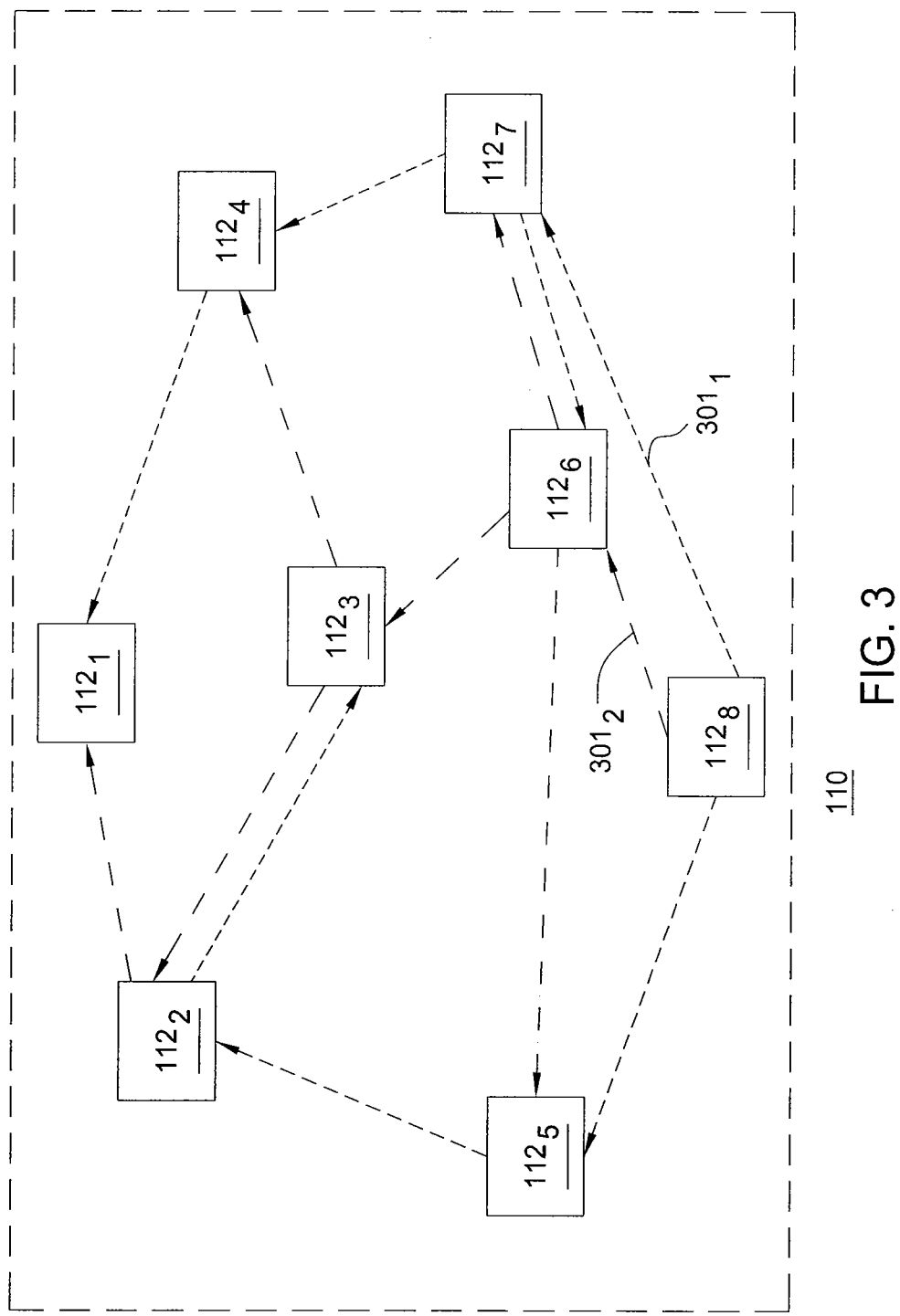
FIG. 3 depicts the communication network of FIG. 1, illustrating a pair of RMTs for a second communication node of the communication network of FIG. 1.

FIG. 3 depicts the communication network of FIG. 1, illustrating a pair of RMTs for a second communication node of the communication network of FIG. 1. As depicted in FIG. 3, a pair of RMTs 301 is computed for CN $112_8$. The pair of RMTs 301 rooted at CN $112_8$ includes a first RMT $301_1$ and a second RMT $301_2$.

The first RMT $301_1$ includes the following paths: from CN $112_8$ to CN $112_7$, from CN $112_7$ to CN $112_6$, from CN $112_7$ to CN $112_4$, from CN $112_4$ to CN $112_1$, from CN $112_8$ to CN $112_5$, from CN $112_5$ to CN $112_2$, and from CN $112_2$ to CN $112_3$. Thus, every CN $112_1$-$112_7$ is reachable from root CN $112_8$ via first RMT $301_1$.

The second RMT $301_2$ includes the following paths: from CN $112_8$ to CN $112_6$, from CN $112_6$ to CN $112_7$, from CN $112_6$ to CN $112_5$, from CN $112_6$ to CN $112_3$, from CN $112_3$ to CN $112_4$, from CN $112_3$ to CN $112_2$, and from CN $112_2$ to CN $112_1$. Thus, every CN $112_1$-$112_7$ is reachable from root CN $112_8$ via second RMT $301_2$.

The first RMT $301_1$ and second RMT $301_2$ provide two disjoint paths from root node CN $112_8$ to every other node, CN $112_1$-CN $112_7$, in CN 110.

As described herein, where CN $112_1$ (source node) is operating as a source of unicast traffic to be delivered to CN $112_8$ (destination node), the unicast traffic may be propagated from CN $112_1$ to CN $112_8$ using either: (1) one or both of first RMT $201_1$ and second RMT $201_2$ rooted at source node CN $112_1$ (as depicted in FIG. 2), or (2) one or both of first RMT $301_1$ and second RMT $301_2$ rooted at destination node CN $112_8$ (as depicted in FIG. 3). If unicast traffic is propagated using first RMT $201_1$ rooted at CN $112_1$, the traffic follows a path from CN $112_1$→CN $112_2$→CN $112_5$→CN $112_8$. If unicast traffic is propagated using second RMT $201_2$ rooted at CN $112_1$, the traffic follows a path from CN $112_1$→CN $112_3$→CN $112_6$→CN $112_8$. If unicast traffic is propagated using first RMT $301_1$ rooted at CN $112_8$, the traffic follows a path from CN $112_1$→CN $112_4$→CN $112_7$→CN $112_8$. If unicast traffic is propagated using second RMT $301_2$ rooted at CN $112_8$, the traffic follows a path from CN $112_1$→CN $112_2$→CN $112_3$→CN $112_6$→CN $112_8$.

If 1+1 protection is used for the unicast traffic, the CN $112_1$ transmits the unicast traffic using: (1) the first RMT $201_1$ and the second RMT $201_2$ rooted at CN $112_1$, or (2) the first RMT $301_1$ and the second RMT $301_2$ rooted at CN $112_8$. As with the multicast traffic, the destination node of the unicast traffic can receive the unicast traffic on the active RMT or the backup RMT of the pair of RMTs used to propagate the unicast traffic.

If 1:1 protection is used for the unicast traffic, CN $112_1$ transmits the unicast traffic using: (1) either first RMT $201_1$ or second RMT $201_2$ (depending on which one is active) in the absence of a failure condition, and using both first RMT $201_1$ and second RMT $201_2$ in the presence of a failure condition until the failure condition is resolved; or (2) either first RMT $301_1$ or second RMT $301_2$ (depending on which one is active) in the absence of a failure condition, and using both first RMT $301_1$ and second RMT $301_2$ in the presence of a failure condition until the failure condition is resolved.

Although omitted from FIG. 3 for purposes of clarity, one or more pairs of RMTs also may be computed for one or more other CNs 112 of the communication network, respectively.

In one embodiment, in which the fault-resilient traffic propagation capability depicted and described herein is implemented in an Ethernet-based transport network, a source node may prefer to or be configured to propagate unicast traffic toward a destination node using the RMT(s) rooted at the destination node (rather than using the RMT(s) rooted at the source node) when an address learning mechanism is available in the Ethernet-based transport network. The nodes of the Ethernet-based transport network may be configured to always propagate unicast traffic using the RMT(s) of the destination node where it is known a priori that an address learning mechanism is available in the Ethernet-based transport network. Alternatively, if the nodes of the Ethernet-based transport network are unsure as to whether an address learning mechanism is available in the Ethernet-based transport network, the nodes may determine whether or not an address learning mechanism is available before deciding whether to use the RMT(s) rooted at the source node or the RMT(s) rooted at the destination node.

Figure 4:
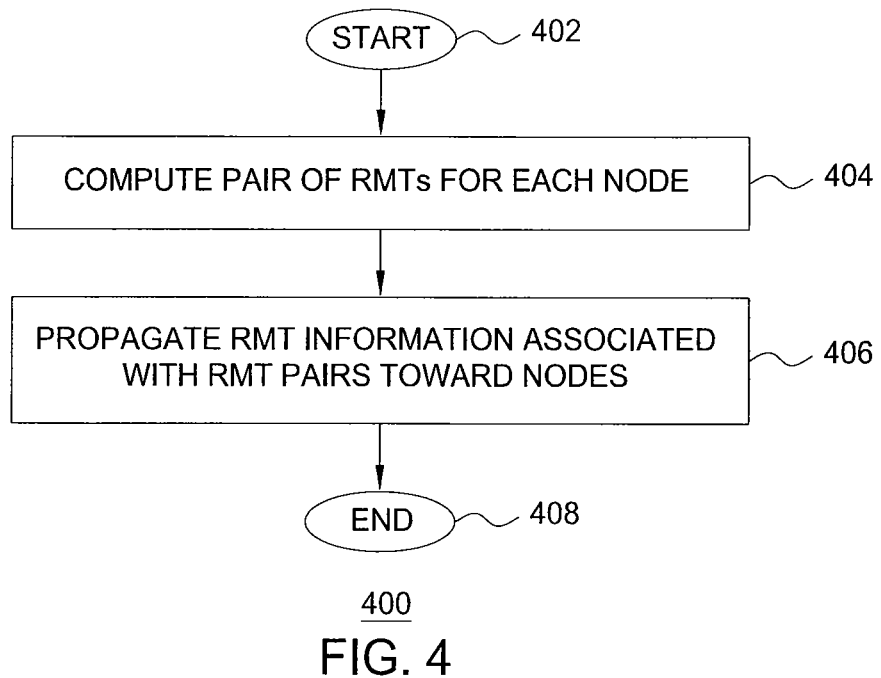
FIG. 4 depicts a high-level block diagram of one embodiment of a method for configuring nodes of a transport network with RMT information adapted for use in providing fault-resilient propagation of multicast traffic and unicast traffic.

FIG. 4 depicts one embodiment of a method for configuring a set of nodes with RMT information adapted for use in providing fault-resilient propagation of multicast traffic and unicast traffic. Although primarily depicted and described herein as being performed serially, at least a portion of the steps of method 400 may be performed contemporaneously, or in a different order than depicted and described with respect to FIG. 4.

As depicted in FIG. 4, the method 400 begins at step 402. At step 404, a pair of RMTs is computed for each node of the set of nodes. At step 406, RMT information associated with the pairs of RMTs is propagated to each node of the set of nodes. At step 408, the method 400 ends. The steps of method 400 may be better understood by way of reference to FIG. 1, a description of which is provided hereinabove.

Figure 5:
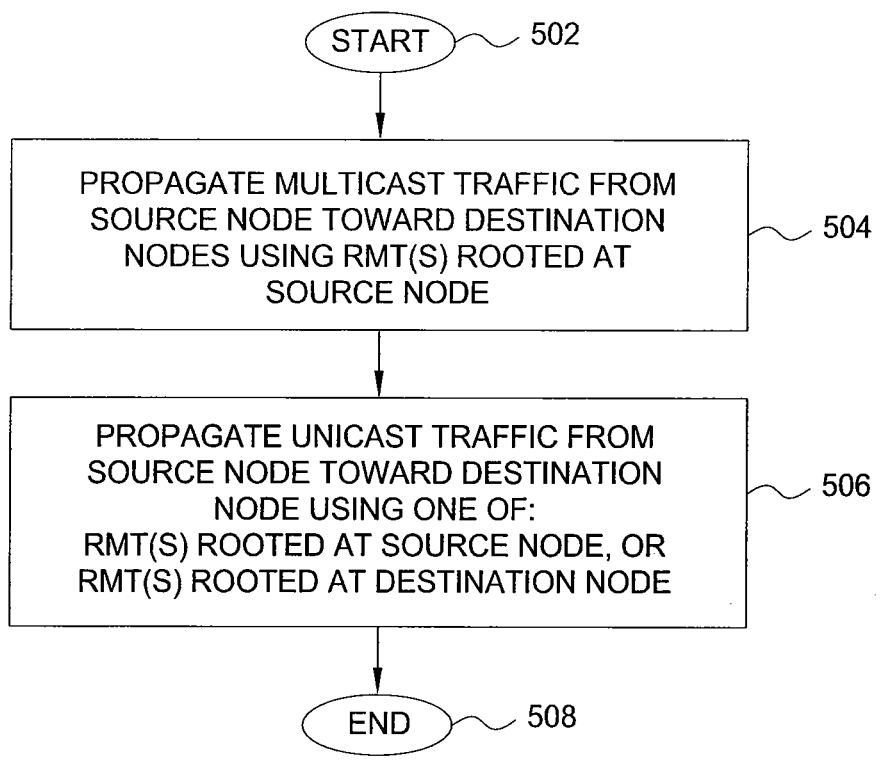
FIG. 5 depicts a high-level block diagram of one embodiment of a method for performing fault-resilient propagation of multicast traffic and unicast traffic from a source node using redundant multicast trees.

FIG. 5 depicts one embodiment of a method for performing fault-resilient propagation of multicast traffic and unicast traffic from a source node using redundant multicast trees. Although primarily depicted and described herein as being performed serially, at least a portion of the steps of method 500 may be performed contemporaneously, or in a different order than depicted and described with respect to FIG. 5.

As depicted in FIG. 5, the method 500 begins at step 502. At step 504, multicast traffic is propagated from the source node toward one or more destination nodes using one or both of the RMTs in a pair of RMTs rooted at the source node. At step 506, unicast traffic is propagated from the source node toward a destination node using one or both of the RMTs in a pair of RMTs rooted at the source node or using one or both of the RMTs in a pair of RMTs rooted at the destination node. At step 508, method 500 ends.

The steps of the method 500 may be better understood by way of reference to FIGS. 1-3, descriptions of which are provided hereinabove.

It will be appreciated that when considering propagation of multicast traffic and unicast traffic from a source node to a particular destination node, the source node and destination node may be referred to more generally as a first node and a second node, respectively.

It will be appreciated that references made herein to source node and destination node are primarily made for purposes of explaining propagation of traffic between nodes, and is not intended to limit the capabilities of the nodes to which reference is made. In this manner, labeling of a node as a source node does not preclude the capability of that node to operate as a destination node for traffic originating at another node and, similarly, labeling of a node as a destination node does not preclude the capability of that node to operate as a source node for providing traffic to one or more other nodes.

As described herein, the fault-resilient traffic propagation capabilities depicted and described herein may be used in order to provide fault-resilient protection of multicast traffic and unicast traffic in Ethernet-based transport networks. The fault-resilient traffic propagation capabilities depicted and described herein are compatible with existing Ethernet forwarding/bridging mechanisms specified by the Ethernet standards. The fault-resilient traffic propagation capabilities depicted and described herein also are compatible with the emerging Institute of Electrical and Electronics Engineers (IEEE) 802.1aq Standard.

Although depicted and described herein with respect to embodiments in which a pair of RMTs is computed and established for each node of a transport network, respectively, it will be appreciated that pairs of RMTs may be computed and established for respective nodes of a subset of nodes of the transport network, respective nodes of multiple transport networks, and the like, as well as various combinations thereof.

Figure 6:
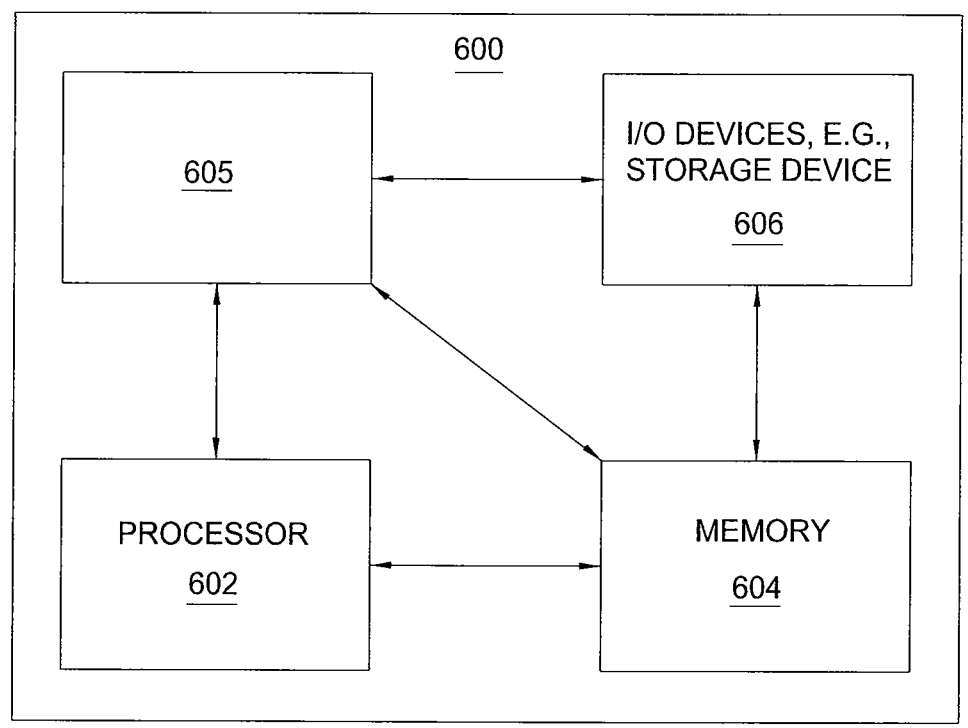
FIG. 6 depicts a high-level block diagram of a general-purpose computer suitable for use in performing the functions described herein.

FIG. 6 depicts a high-level block diagram of a general-purpose computer suitable for use in performing the functions described herein. As depicted in FIG. 6, system 600 comprises a processor element 602 (e.g., a CPU), a memory 604, e.g., random access memory (RAM) and/or read only memory (ROM), an RMT management module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the RMT management process 605 can be loaded into memory 604 and executed by processor 602 to implement the functions as discussed above. As such RMT management process 605 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for providing fault-resilient propagation of traffic from a first node toward a second node, wherein the first node and the second node each have a respective pair of redundant multicast trees (RMTs) rooted thereat, wherein the pair of RMTs rooted at the first node comprises a pair of node-disjoint paths from the first node to the second node and the pair of RMTs rooted at the second node comprises a pair of node-disjoint paths from the second node to the first node, the method comprising:

propagating multicast traffic from the first node toward the second node using at least one of the RMTs in the pair of RMTs rooted at the first node; and propagating unicast traffic from the first node toward the second node using at least one of the RMTs in the pair of RMTs rooted at the first node, or at least one of the RMTs in the pair of RMTs rooted at the second node.

2. The method of claim 1, wherein the unicast traffic is propagated from the first node toward the second node using at least one of the RMTs in the pair of RMTs rooted at the second node when the second node supports an address learning mechanism.

3. The method of claim 1, wherein:

when a 1+1 protection scheme is used, the multicast traffic is propagated using both of the RMTs in the pair of RMTs rooted at the first node; and when a 1:1 protection scheme is used, the multicast traffic is propagated using one of the RMTs in the pair of RMTs rooted at the first node in the absence of a failure condition and is propagated using both of the RMTs in the pair of RMTs rooted at the first node in the presence of a failure condition.

4. The method of claim 1, wherein:

when a 1+1 protection scheme is used, the unicast traffic is propagated using one of: both of the RMTs in the pair of RMTs rooted at the first node or both of the RMTs in the pair of RMTs rooted at the second node; and when a 1:1 protection scheme is used, the unicast traffic is propagated using one of:

one of the RMTs in the pair of RMTs rooted at the first node in the absence of a failure condition, or both of the RMTs in the pair of RMTs rooted at the first node in the presence of a failure condition; or one of the RMTs in the pair of RMTs rooted at the second node in the absence of a failure condition, or both of the RMTs in the pair of RMTs rooted at the second node in the presence of a failure condition.

5. The method of claim 1, further comprising:

receiving, at the first node, a pair of RMT identifiers associated with the pair of RMTs rooted at the second node.

6. The method of claim 1, wherein the first and second nodes form part of an Ethernet-based transport network.

7. A first node for providing fault-resilient propagation of traffic node toward a second node, wherein the first node and the second node each have a respective pair of redundant multicast trees (RMTs) rooted thereat, wherein the pair of RMTs rooted at the first node comprises a pair of node-disjoint paths from the first node to the second node and the pair of RMTs rooted at the second node comprises a pair of node-disjoint paths from the second node to the first node, wherein the first node comprises:

means for propagating multicast traffic toward the second node using at least one of the RMTs in the pair of RMTs rooted at the first node; and means for propagating unicast traffic toward the second node using at least one of: at least one of the RMTs in the pair of RMTs rooted at the first node, or at least one of the RMTs in the pair of RMTs rooted at the second node.

8. The node of claim 7, wherein the unicast traffic is propagated toward the second node using at least one of the RMTs in the pair of RMTs rooted at the second node when the second node supports an address learning mechanism.

9. The apparatus of claim 7, wherein:

when a 1+1 protection scheme is used, the multicast traffic is propagated using both of the RMTs in the pair of RMTs rooted at the first node; and when a 1:1 protection scheme is used, the multicast traffic is propagated using one of the RMTs in the pair of RMTs rooted at the first node in the absence of a failure condition and is propagated using both of the RMTs in the pair of RMTs rooted at the first node in the presence of a failure condition.

10. The apparatus of claim 7, wherein:

when a 1+1 protection scheme is used, the unicast traffic is propagated using one of: both of the RMTs in the pair of RMTs rooted at the first node or both of the RMTs in the pair of RMTs rooted at the second node; and when a 1:1 protection scheme is used, the unicast traffic is propagated using one of:

one of the RMTs in the pair of RMTs rooted at the first node in the absence of a failure condition, or both of the RMTs in the pair of RMTs rooted at the first node in the presence of a failure condition; or one of the RMTs in the pair of RMTs rooted at the second node in the absence of a failure condition, or both of the RMTs in the pair of RMTs rooted at the second node in the presence of a failure condition.

11. The apparatus of claim 7, further comprising:

means for receiving a pair of RMT identifiers associated with the pair of RMTs rooted at the second node.

12. The apparatus of claim 7, the first node forms part of an Ethernet-based transport network.

13. A non-transitory computer readable storage medium storing a software program which, when executed by a computer, causes the computer to perform a method for providing fault-resilient propagation of traffic from a first node toward a second node, wherein the first node and the second node each have a respective pair of redundant multicast trees (RMTs) rooted thereat, wherein the pair of RMTs rooted at the first node comprises a pair of node-disjoint paths from the first node to the second node and the pair of RMTs rooted at the second node comprises a pair of node-disjoint paths from the second node to the first node, the method comprising:

propagating multicast traffic from the first node toward the second node using at least one of the RMTs in the pair of RMTs rooted at the first node; and propagating unicast traffic from the first node toward the second node using at least one of: at least one of the RMTs in the pair of RMTs rooted at the first node, or at least one of the RMTs in the pair of RMTs rooted at the second node.

14. The non-transitory computer readable storage medium of claim 13, wherein the unicast traffic is propagated from the first node toward the second node using at least one of the RMTs in the pair of RMTs rooted at the second node when the second node supports an address learning mechanism.

15. The non-transitory computer readable storage medium of claim 13, wherein:

when a 1+1 protection scheme is used, the multicast traffic is propagated using both of the RMTs in the pair of RMTs rooted at the first node; and when a 1:1 protection scheme is used, the multicast traffic is propagated using one of the RMTs in the pair of RMTs rooted at the first node in the absence of a failure condition and is propagated using both of the RMTs in the pair of RMTs rooted at the first node in the presence of a failure condition.

16. The non-transitory computer readable storage medium of claim 13, wherein:

when a 1+1 protection scheme is used, the unicast traffic is propagated using one of: both of the RMTs in the pair of RMTs rooted at the first node or both of the RMTs in the pair of RMTs rooted at the second node; and when a 1:1 protection scheme is used, the unicast traffic is propagated using one of:

one of the RMTs in the pair of RMTs rooted at the first node in the absence of a failure condition, or both of the RMTs in the pair of RMTs rooted at the first node in the presence of a failure condition; or one of the RMTs in the pair of RMTs rooted at the second node in the absence of a failure condition, or both of the RMTs in the pair of RMTs rooted at the second node in the presence of a failure condition.

17. The non-transitory computer readable storage medium of claim 13, further comprising:

receiving, at the first node, a pair of RMT identifiers associated with the pair of RMTs rooted at the second node.

18. The non-transitory computer readable storage medium of claim 13, wherein the first and second nodes form part of an Ethernet-based transport network.

19. A method for enabling fault-resilient propagation of multicast traffic and unicast traffic from a first node toward a second node, comprising:

computing, for the first node, a pair of redundant multicast trees (RMTs) rooted at the first node, wherein the pair of RMTs rooted at a first node comprises a pair of node-disjoint paths from the first node to the second node;

computing, for the second node, a pair of redundant multicast trees (RMTs) rooted at the second node, wherein the pair of RMTs rooted at the second node comprises a pair of node-disjoint paths from the second node to the first node; and propagating, toward the first node, RMT information associated with the pairs of RMTs computed for first and second nodes, wherein the RMT information is adapted for use by the first node to provide fault-resilient propagation of traffic toward the second node by:

propagating multicast traffic from the first node toward the second node using at least one of the RMTs in the pair of RMTs rooted at the first node; and propagating unicast traffic from the first node toward the second node using at least one of: at least one of the RMTs in the pair of RMTs rooted at the first node, or at least one of the RMTs in the pair of RMTs rooted at the second node.

20. A system for providing fault-resilient propagation of multicast traffic and unicast traffic using redundant multicast trees, comprising a plurality of nodes for transmitting and receiving multicast traffic and unicast traffic; and a management system, for computing, for each of the nodes, a pair of RMTs rooted at that node, and for propagating, to each of the nodes, RMT information associated with the pairs of RMTs computed for the respective nodes;

wherein the RMT information propagated to the nodes is adapted for use by the nodes to perform fault-resilient propagation of multicast traffic and unicast traffic;

wherein propagation of multicast traffic from a first node comprises propagating the multicast traffic using at least one of the RMTs in the pair of RMTs rooted at the first node;

wherein propagation of unicast traffic from a first node toward a second node comprises propagating the unicast traffic using at least one of: at least one of the RMTs in the pair of RMTs rooted at the first node, or at least one of the RMTs in the pair of RMTs rooted at the second node.

* * * * *